US012113703B2

(12) United States Patent
Vuggrala et al.

(10) Patent No.: US 12,113,703 B2
(45) Date of Patent: Oct. 8, 2024

(54) DATA TRANSFER FOR ACCESS POINTS OR SWITCHES IN A CLUSTER UPON DATA TUNNEL FAILURE

(71) Applicant: Hewlett Packard Enterprise Development LP, Houston, TX (US)

(72) Inventors: Shravan Kumar Vuggrala, Bangalore (IN); Raghunandan Prabhakar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 217 days.

(21) Appl. No.: 17/587,143

(22) Filed: Jan. 28, 2022

(65) Prior Publication Data

US 2023/0246951 A1   Aug. 3, 2023

(51) Int. Cl.
*H04L 45/28* (2022.01)
*H04L 45/00* (2022.01)
*H04L 45/021* (2022.01)
*H04L 61/103* (2022.01)

(52) U.S. Cl.
CPC ............ *H04L 45/28* (2013.01); *H04L 45/021* (2013.01); *H04L 45/66* (2013.01); *H04L 61/103* (2013.01)

(58) Field of Classification Search
CPC ...................................... H04L 45/28
USPC ........................................... 709/230
See application file for complete search history.

(56) References Cited

U.S. PATENT DOCUMENTS

2019/0286737 A1*   9/2019   Pan .................. G06F 9/545

FOREIGN PATENT DOCUMENTS

EP       3134997 A1     3/2017

OTHER PUBLICATIONS

Aruba, "User Roles and User-Based Tunneling," Technical Whitepaper, Revised—Feb. 2019, 106 pages.

* cited by examiner

*Primary Examiner* — Sibte H Bukhari
(74) *Attorney, Agent, or Firm* — Jaffery Watson Mendonsa & Hamilton

(57) ABSTRACT

Data transfer for access points or switches in a cluster upon data tunnel failure is described. An example includes receiving uniform mapping information for a cluster including a bucket map mapping an active gateway and a standby gateway for each of multiple entries, the bucket map including mapping a first gateway node as a standby gateway and a second gateway node as an active gateway for an entry. Synchronized user information is received from the second gateway node including identification of a user indexed to the first entry. A message is received from a first AP or switch requesting activation of the user on the first gateway node as a standby gateway upon failure of a data tunnel between the first AP or switch and the second gateway node. The user is activated on the first gateway node.

9 Claims, 12 Drawing Sheets

DATA TRANSFER FOR ACCESS POINTS OR SWITCHES IN A CLUSTER UPON DATA TUNNEL FAILURE

BACKGROUND

In a wide area local network (WLAN) operations, there may be a cluster of nodes to act as gateways for data traffic for multiple different access points or switches.

In operation, a node within the cluster may fail, and the cluster solution is utilized to provide failover for traffic flow. Upon the loss of a node, the cluster of nodes will generally detect the failure, and perform a failover to another node.

BRIEF DESCRIPTION OF THE DRAWINGS

Examples described here are illustrated by way of example, and not by way of limitation, in the figures of the accompanying drawings in which like reference numerals refer to similar elements.

DETAILED DESCRIPTION

Figure 1:
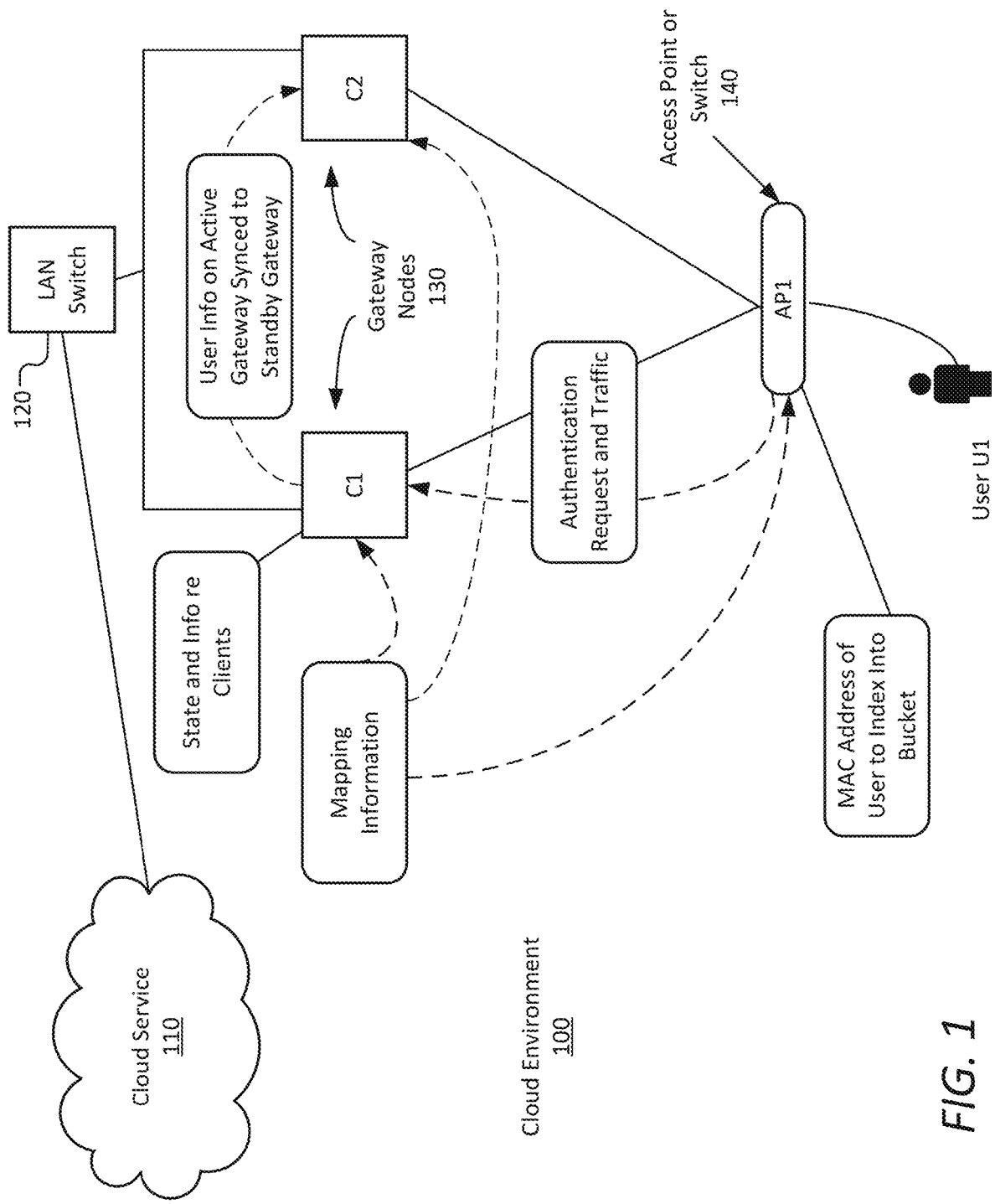
FIG. 1 is an illustration of a computing infrastructure to provide seamless traffic flow to access points or switches in cluster deployments upon tunnel failure, according to some examples.

Examples described herein are directed to seamless traffic flow to access points or switches in cluster deployments upon tunnel failure.

Cluster deployments are widely used in certain environments, such as Remote Access Point (RAP) and Campus Access Point (CAP) deployments today. In particular, a cluster deployment may exist in a cloud environment in which obtain cloud services from a cloud service provide. For example, a user may communicate via an access point or switch to a gateway node. The gateway node then communicates with the cloud service. Such technology is applied to provide a seamless flow for the data traffic. Cluster deployment may also be applied in dynamic segmentation. The term gateway node refers to a controller, wherein controller may be implemented as hardware or a combination of hardware and software, including a hardware device, a virtual machine, a VPN (Virtual Private Network) concentrator, or other controller.

Upon the failure of a gateway node within a cluster, the other nodes of the cluster will generally become quickly aware of the failure, and thus can act to provide failover to another gateway node within the cluster. However, loss of connection is not limited to the failure of a node, For example, in CAP, RAP, or Micro-branch deployments across a wide-area network (WAN) there are numerous scenarios in which an access point or switch may lose tunnel connectivity with a cluster node (wherein the tunnel refers to data tunneling to transport data across a network). For example, the scenarios may include:

(1) An uplink switch connected to a problematic cluster node may be malfunctioning, and hence, even though cluster itself is intact, access points or switches may lose connectivity with one cluster node only;

(2) Deployments in which switches are stacked or ran in HA (High Availability) mode may have issues with forwarding specific traffic, which thus brings down the tunnels from the access points or switches to the gateway nodes;

(3) Scenarios in which where cluster nodes are, for example, located in different buildings and where cluster connectivity is being provided through switches that are different from the switches that are WAN facing and provide connectivity to a remote access points and micro-branch access points; and (4) Scenarios involving software issues on a gateway for certain access points or switches, which cause the tunnel to go down for these access points.

In such scenarios, traffic will get "black-holed" (i.e., the traffic is directed to a location where data will be discarded without notice of non-delivery) towards the cluster node that is not reachable and, because the cluster itself is intact, there may be no failover initiated to a standby cluster node or to backup cluster node.

In contrast with the operation in traditional technology, a system is described herein to provide a smooth failover of data transport in a cloud environment between an access point or switch and a gateway node upon a failure of the tunnel, and thus allows continued flow of data traffic during such tunnel failure. Uniform mapping is generated by a central service for a cluster of gateway nodes in the cloud environment, wherein the uniform mapping includes mapping of gateways (which may be generated in the form of a "bucket map" for a set of bucket indexes) with identification of active gateways and standby gateways to be indexed to each cloud service user, and mapping of a gateway node as a DDG (Device Designated Gateway) for each access point or switch in the cluster. The selected DDG is responsible for all control plane communications to an associated access point or switch. For example, the central service may select the DDGs in a round robin fashion so that the DDGs are distributed through the access points or switches. The uniform mapping information is pushed from the central service to access points, switches, and gateway nodes in the cluster to enable smooth failover to standby gateway nodes when tunnel failure occurs.

Upon detection of the loss of a tunnel between an access point or switch and a first gateway node for a cloud service (wherein the detection of the loss of the tunnel may occur due to loss of a "heartbeat signal" provided for the tunnel, the heartbeat signal being a signal generated at certain intervals by the gateway node and detected by the access point or switch to inform the access point or switch that the tunnel remains active), the access point or switch may request activation of a second gateway that is designated as a standby gateway. In response to the request, the second gateway node then becomes the active gateway for a user or users behind the access point or switch that previously had the first active gateway node as an active gateway. Establishment of the second gateway node as the active gateway for the user or users behind the access point or switch thus enables continued data flow in the cloud service.

This operation may be utilized to enable seamless traffic flow upon tunnel failure in any of a variety of cluster deployments, such as, for example, CAP (Client Access Point), RAP (Remote Access Point), Dynamic Segmentation, and micro-branch (wherein micro-branch refers to a device (such as an access point (AP)) having branch capabilities (multiple uplink, load balancing, WAN (Wide Area Network) optimization, dynamic path steering, etc.)). This provides a valuable addition to micro-branch deployments that are spread across a WAN, and hence any tunnel failure to a particular node would not disrupt the traffic. In deployments where cluster nodes are spread among different buildings or physical location, this provides seamless traffic flow for networks by quickly failing over to the standby nodes.

As used herein, a bucket map refers to a data structure that maps client traffic to a set of gateways in a cluster, the bucket map representing a hash table including a certain number of buckets (wherein a "bucket" refers to a particular entry in the hash table). The access points and switches then use the bucket map to determine where to send client traffic among the various different gateway nodes in the cluster. The gateways in the bucket map may be selected in a round robin operation to provide client traffic load balancing. The bucket map may be common for all the access points and switches that are served in the cluster.

Further, an example operates to centralize gateway node mapping and DDG mapping in the cloud service, which provides a single point to advertise these mappings from the cloud service to all devices in the cloud environment deployment. This further reduces the load on cluster nodes, and provides a single location to monitor, debug, and troubleshoot if any errors or other issues arise with regard to the gateway information in the cluster.

FIG. 1 is an illustration of a computing infrastructure to provide seamless traffic flow to access points or switches in cluster deployments upon tunnel failure, according to some examples. As illustrated, in a particular cloud computing infrastructure, an assess point or switch 115, such as the illustrated access point AP1, may be connected to a cluster of gateway nodes 110 to a switch, such as a LAN (Local Area Network) switch 105, to a cloud service 100. The access point or switch 115 may provide service to one or more users, such as User U1 as illustrated in FIG. 1. It is noted that FIG. 1 provides a simplified cloud environment for illustration, and an actual implementation may include a large number of LAN switches, gateway nodes, access points or switches, and other network elements in varying arrangements.

In an example, mapping information is provided to each of multiple gateway nodes 110 in a cluster, the gateway nodes 110 shown as C1 and C2, and access points or switches 115, shown as access point AP1. The mapping information, as further illustrated in FIG. 2, includes DDG mappings for each access point or switch in the cloud environment and a bucket map that allocates an active gateway and a standby gateway for each bucket index. The gateways may be selected in a round robin or other arrangement, wherein the gateway selection may be used to implement client traffic load balancing. The bucket map is common for all the access points and switches in the cluster, and the access points and switches use the bucket map to transfer client traffic to appropriate gateways in the cluster. In the illustrated example, access point AP1 includes a MAC (Media Access Control) address of a client (user U1 in the illustration) to index into a particular bucket in the bucket map.

For example, U1 may be indexed into a particular bucket indicating C1 as an active gateway node and C2 as a standby gateway node. Data tunnels are established (such as by a tunnel orchestrator service) for transfer of client data traffic, including a tunnel between AP1 and C1. In this example, AP1 may provide an authentication request and data traffic to C1 as the active gateway for user U1. C1 includes a current state and information for active clients, including U1. Further, based on the mapping information received from the central service, the user information on the active gateway (C1 in this example) is synced to the standby gateway (C2) to support failover operation. The active gateway (C1) builds a context stating that the user (U1) is behind the access point or switch (AP1), and the standby gateway (C2) builds a context indicating that U1 is behind AP1 for which C1 is active and C2 is standby.

It is noted that while C1 is the active gateway and C2 is the standby gateway for a certain bucket index as shown in FIG. 1, the same gateway may have different roles for other users. For example, C2 may be an active gateway for one or more users behind a particular access point or switch, and C1 may be a standby gateway for one or more uses behind a particular access point or switch.

During operation the tunnel between C1 and AP1 may be lost due to any of multiple different causes. As a result, data traffic between AP1 to C1 will not be transferred. However, while the tunnel is lost, the gateway node C1 may be operational, and thus the loss of the tunnel may not be detected by the cluster of gateway nodes for failover. In this circumstance, the access point AP1 is to detect the loss of the tunnel by the loss of the heartbeat with the active gateway. In response AP1 is to send a control plane message to the standby gateway (C2) as indicated in the bucket map, wherein the message contains a request that users that were active on C1 be activated on C2 as the selected standby gateway.

In response to C2 receiving the control plane message from AP1, the user or users behind AP1 that were active on C1 (this being U1 in the illustrated example) are now activated on C2. These users would be activated on the data path. Further, a gratuitous ARP (Address Resolution Protocol) (i.e., an ARP response that is not prompted by an ARP request) is also sent from the standby gateway to an upstream switch (i.e., upstream from the gateway) on behalf of the user or users so that reverse traffic (traffic that is directed to the user or users) will be directed back to C2.

After the standby gateway (C2) completes the activation in the data path, the standby gateway sends an ACK (Acknowledgement) to the control plane message back to the access point or switch (AP1). After receiving the ACK from C2, AP1 switches traffic for the users to the standby gateway tunnel (the gateway tunnel between AP1 and C2) and, because users are activated on the standby gateway (C2) for users behind AP1, traffic continues to flow and is not dropped, despite the failure of the tunnel between AP1 and C1.

Further, new users (users that were not associated with AP1 at the time of the failover process) can associate with AP1 in the failed over state. In this circumstance, AP1 will send an authenticate request to C2, given that tunnel to C1 is currently down. Based on the central mapping information and the current failover state, the new users (which would normally be authenticated through C1) are authenticated through C2, and begin communication of data. In this manner, new users can commence operation and data traffic for any new user also flows can be successfully handled without being dropped.

In a further example, a failed tunnel can be reestablished for users once the tunnel becomes available. Upon failure of a tunnel, the tunnel orchestrator service continues to attempt to reestablish the failed tunnel with the gateway (C1). Once the tunnel with C1 comes back up, AP1 sends a control plane message to C1 to activate the users behind AP1. Upon receipt of the message, C1 activates the users of C1 that were previously active on C2 during the period of the failure of the tunnel between AP1 and C1. Users would be activated on the data path and a gratuitous ARP is sent for these users from C1 to the upstream switch so that reverse traffic can come back to C1. Hence, this operation restores the original state for the cluster, and data traffic can continue to flow to the original cluster node (C1) once the tunnel is back up.

Figure 2:
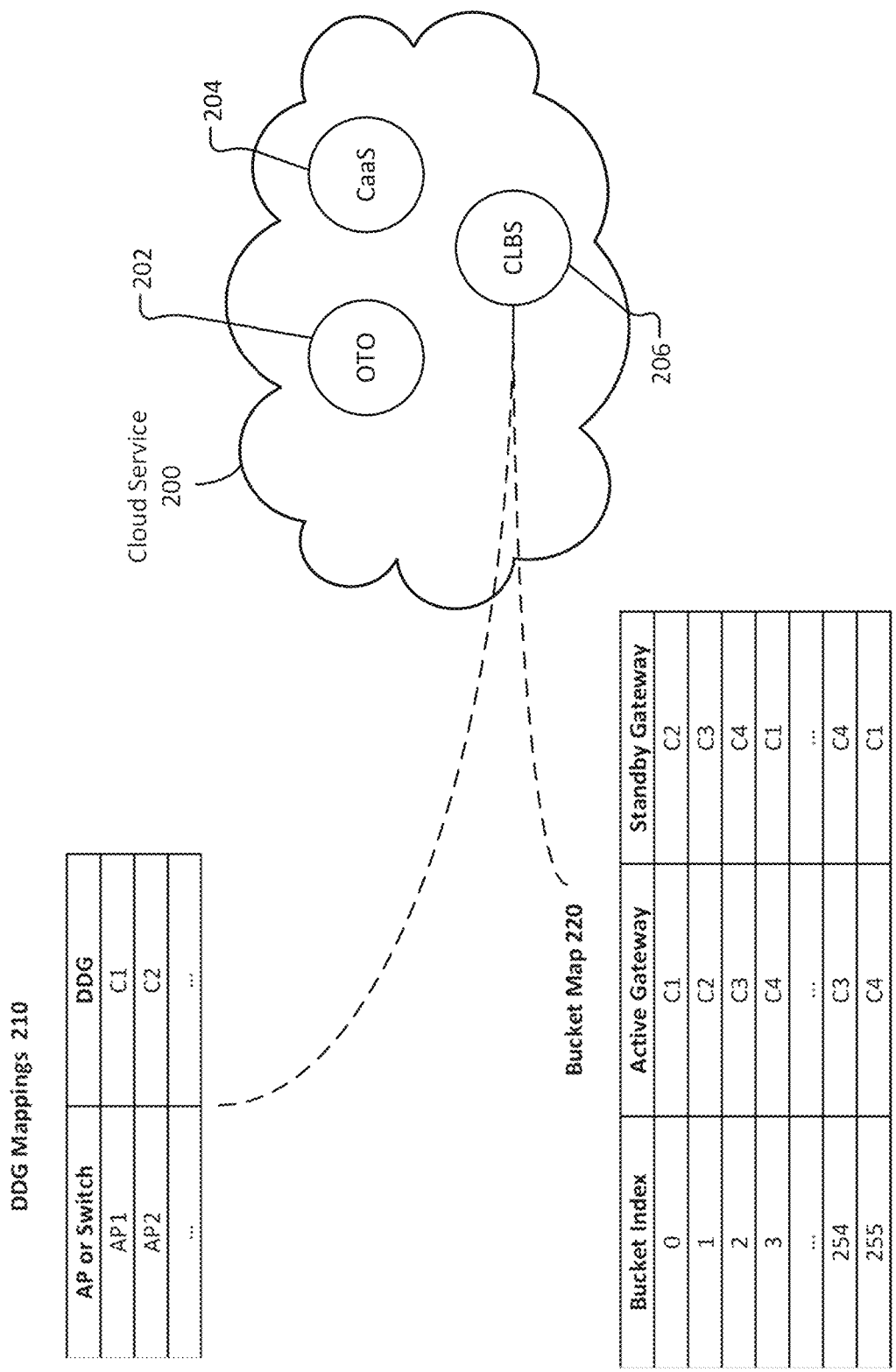
FIG. 2 is an illustration of mapping information generated for gateway clusters in a cloud environment, according to some examples.

FIG. 2 is an illustration of mapping information generated for gateway clusters in a cloud environment, according to some examples. In some examples, mapping information is generated for a cloud service 200 in a cloud environment. A particular implementation of a cloud service 200 may include an OTO (Overlay Tunnel Orchestrator) 202 representing a tunnel orchestrator service for the cloud to establish data tunnels between network elements, CaaS (Cloud as a Service) 204 to be provided to users, and a central service (which may be referred to as a cluster load balances service (CLBS) 206) to provide uniform mapping of the elements of a cluster to be pushed out to each element of the cluster. The illustrated elements of the cloud service 200 are provided as examples, and the cloud service is not limited to this particular implementation. The central service 200 is to provide one or both of the following in the uniform mapping information:

(1) Generation of a mapping of the gateways in a cluster—the pushing of this information provides a consistent view of the mapping to all such elements; and
(2) Selection of a DDG (Device Designated Gateway) for each access point or switch.

In a particular example, a cluster may include gateway nodes C1, C2, C3, and C4, with such gateway nodes supporting a set of access points or switches, including access points AP1 and AP2. The CLBS (as the central service in this example) generates DDG mappings 210, which in this instance selects C1 as the DDG for AP1 and C2 as the DDG for AP2. Further, the CLBS generates a bucket map 220 to provide the mapping of the gateways in the cluster, which in this example has 256 bucket entries from 0 to 255. As shown, the bucket map 220 contains mappings of the gateways in the cluster to the buckets as active and standby gateways. In an example, the buckets may be indexed to users based on the MAC address for each user (such as hashing the last three bytes of the client MAC to obtain a hash value that is indexed into the bucket map to point to a certain bucket). In the illustrated example, a first bucket (Bucket Index 0) is assigned C1 as an active gateway and C2 as a standby gateway, a second bucket (Bucket Index 1) is assigned C2 as an active gateway and C3 as a standby gateway, and continuing through Bucket Index 255.

The CLBS will then push the mapping information (including the DDG mappings 210 and the bucket map 220) to all devices in the cluster, including all gateway nodes, access points, and switches, and such devices are to maintain and utilize this information. The mapping information then applied to cloud service users that are serviced in the cluster. For example, the mapping information may be applied in a cloud environment as illustrated in FIGS. 3A-3D.

Figure 3A:
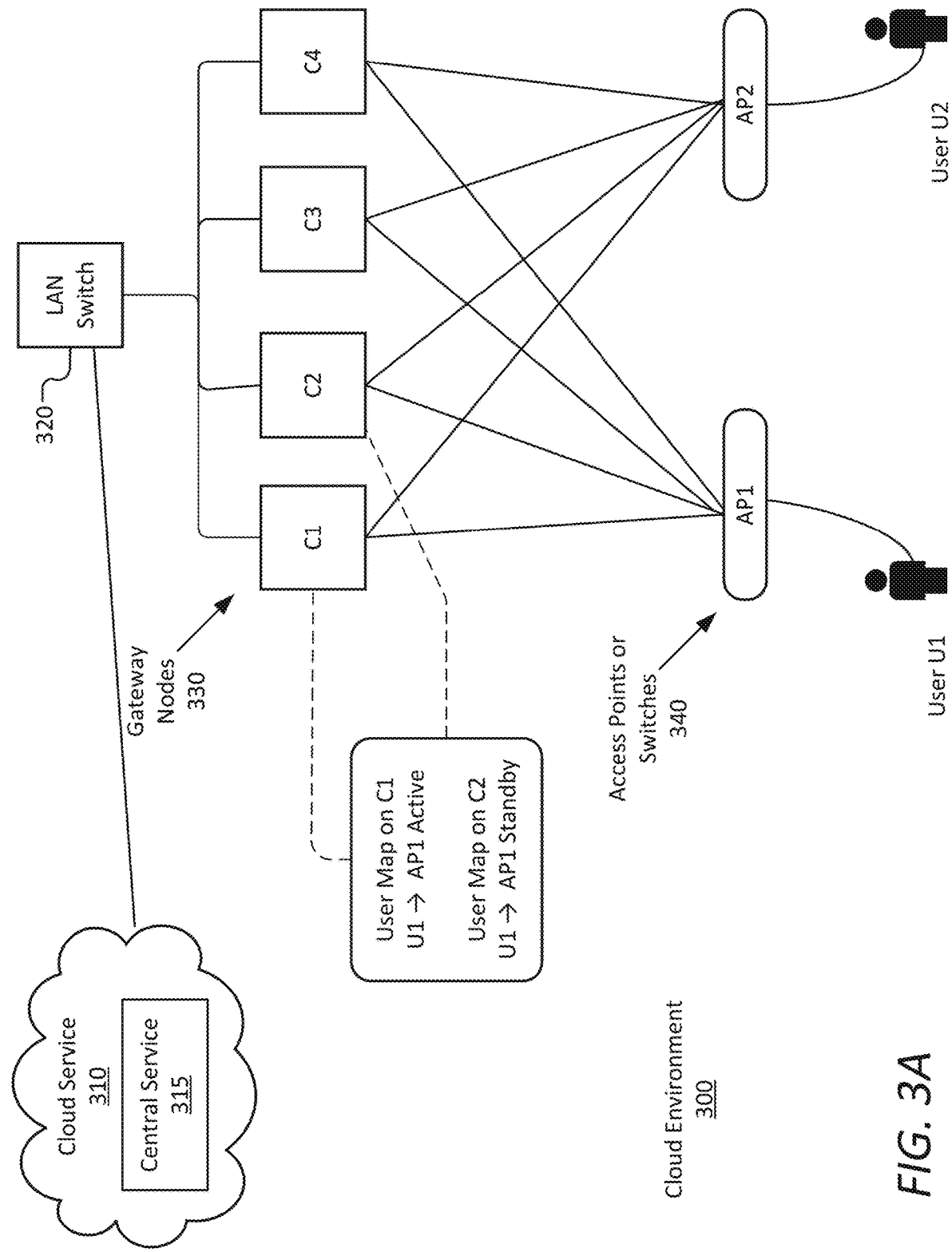
FIG. 3A is an illustration of a system to provide seamless traffic flow to access points or switches in cluster deployments upon tunnel failure, according to some examples.

FIG. 3A is an illustration of a system to provide seamless traffic flow to access points or switches in cluster deployments upon tunnel failure, according to some examples. In a particular example, a cloud environment 300 includes a cloud service 310 to provide services to multiple users. In FIG. 3A, a LAN switch 320 may be connected to a cluster of gateway nodes 330 in the cloud environment 300, wherein the gateway nodes 330 include nodes C1, C2, C3, and C4. The gateway nodes 330 are connected to multiple access points or switches 340, wherein the access points or switches 340 includes access points AP1 and AP2. In a particular example, user U1 connects to the cloud service 310 via access point AP1 and user U2 connects to the cloud service 310 via access point AP2.

In an example, the cloud service 310 provides a central service 315 to generate mapping information for the gateway nodes 330 and access points or switches 340 in a cluster, wherein the mapping information may include a DDG map to provide a selected DDG for each access point or switch in the cloud environment, and a bucket map to provide active and standby gateway assignments for indexing to users receiving cloud services. In the example illustrated in FIG. 3A, the central service 315 provides the mapping information to each of the gateways (C1, C2, C3, and C4) and each of the access points or switches (AP1 and AP2) in the cluster. Data tunnels may be established between gateways and the access points or switches by a tunnel orchestrator service (such as OTO 202 illustrated in FIG. 2) for use in the transfer of data.

The access points and switches use the MAC addresses of each user to index into the bucket assignments in the bucket map (such as by hashing the last three bytes of the user MAC to generate a bucket index), and send an authentication request to the active gateway as presented in the mapping table. Once a gateway node receives the initial authentication request from an access point or switch, the gateway node builds the state and information with respect to the users that are behind that particular access point or switch. This information is also stored in the data path for the access point or switch.

In FIG. 3A, users U1 and U2 may each be indexed into any assignment of active and standby gateways from the mapping information, depending on the indexing for the users. In a particular example, AP1 may receive an assignment of C1 as an active gateway and C2 as a standby gateway. Based on this mapping information, AP1 is to request activation of U1 on the C1 gateway. Upon acceptance of the request, C1 builds a context (including generating a user map) indicating that the user U1 behind AP1 is active on C1, with the context being synced to C2. C2 then builds a context indicating that U1 is behind AP1 is standby on C2. As this is indicated in FIG. 3A, a user map for gateway node C1 indicates that that U1 is an active user, and a user map for gateway node C2 indicates that that U1 is a standby user (indicating that U1 is not active on C2). It is noted that user U2 behind AP2 may be indexed into the same or different access point or switch, and, in a particular example, may be active on C2 and standby on C3. In this state, cloud data traffic for user U1 is transferred over a data tunnel between AP1 and C1, and cloud data traffic for user U2 is transferred over a data tunnel between AP2 and C2, with C2 being a standby gateway node for U1 and C3 being a standby node for U2.

Once AP/Switch loses the tunnel to a particular cluster node such as C1, it loses heartbeat and, in response to detection of loss of the heartbeat signal, the AP/Switch then sends a control plane message to the standby gateway, C2, as present in the mapping table. The message is to request for activation on the standby gateway—C2 in this example.

Figure 3B:
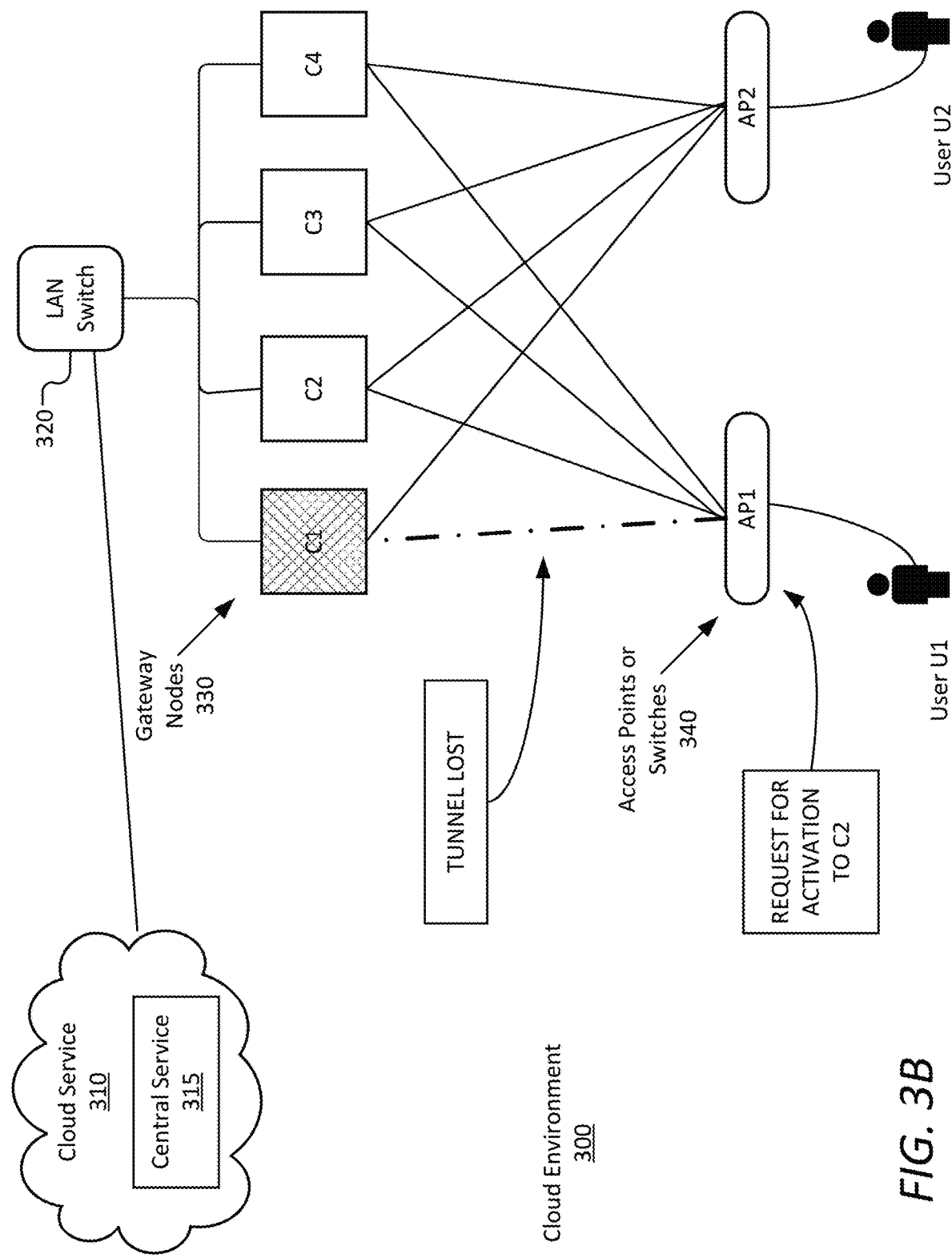
FIG. 3B is an illustration of a system in a tunnel failure state, according to some examples.

FIG. 3B is an illustration of a system in a tunnel failure state, according to some examples. In a cloud environment 300, there is a cloud service 310 with central service 315, a LAN switch 320, a cluster of gateway nodes 330 (C1, C2, C3, C4), and multiple access points or switches 340 (AP1, AP2) to provide cloud services to one or more users (U1, U2). In this state, each of the gateway nodes and access points or switches has uniform mapping information for the cluster, the uniform mapping information being generated and pushed out by the central service 315. In particular, a data tunnel may exist between AP1 and C1 for use in transporting data for user U1, wherein C1 is the active gateway for the user(s) behind AP1 according to the mapping information. A heartbeat signal may be generated by C1, the heartbeat signal being detected by AP1 to inform AP1 that the data tunnel is active.

As illustrated in FIG. 3B, the data tunnel between AP1 and C1 may be lost for any of multiple reasons. As a result, the heartbeat signal generated by the C1 gateway node ceases operation. AP1 is operable to determine that the data tunnel has been lost based on the loss of the heartbeat signal, and to generate a request to be transmitted to a standby gateway according to the mapping information (the standby gateway being C2 in this example) to allow failover of the data traffic for U1.

Figure 3C:
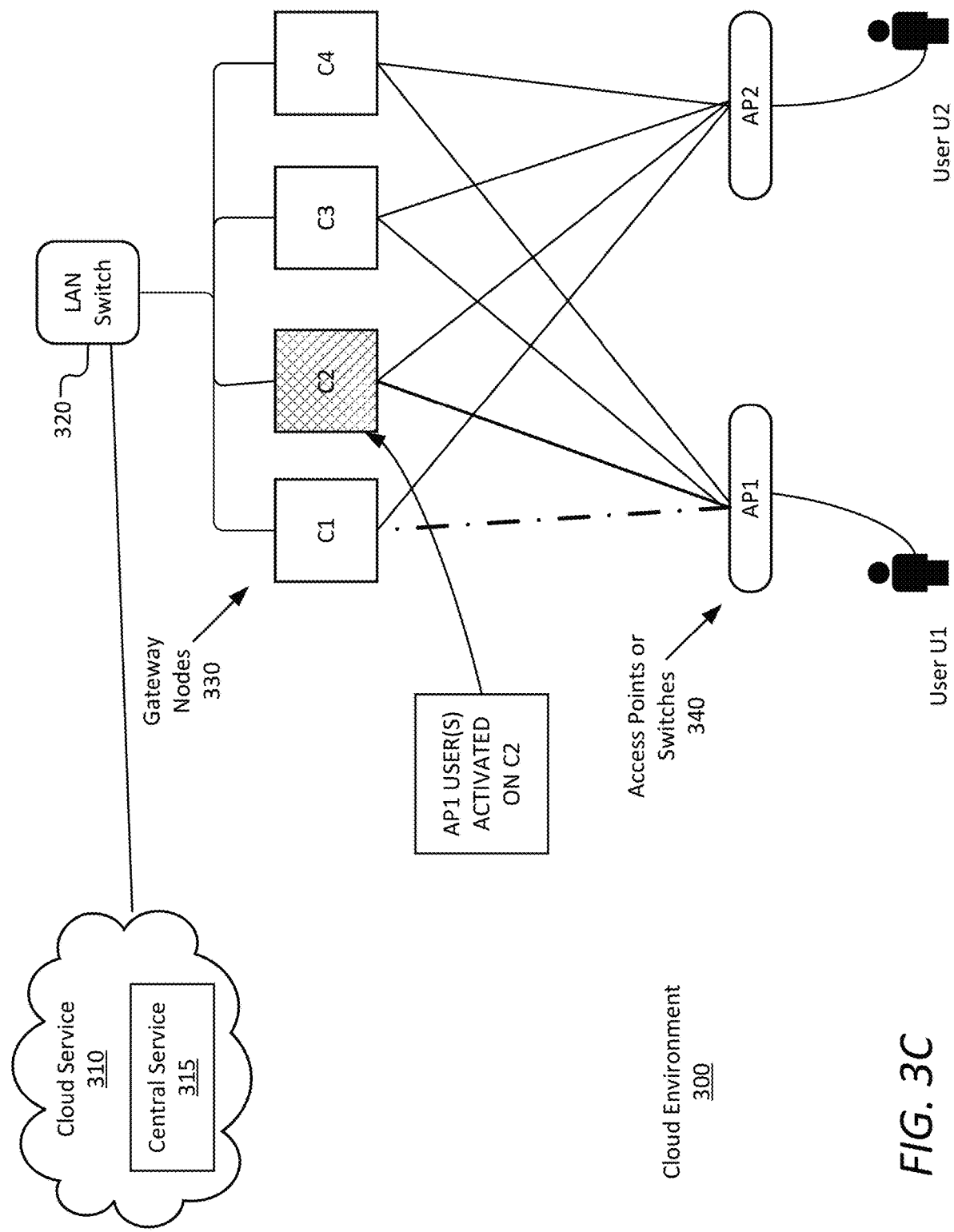
FIG. 3C is an illustration of a system in a failover state following a tunnel failure, according to some examples.

FIG. 3C is an illustration of a system in a failover state following a tunnel failure, according to some examples. In a cloud environment 300 including the cloud service 310 with central service 315, LAN switch 320, cluster of gateway nodes 330 (C1, C2, C3, C4), and multiple access points or switches 340 (AP1, AP2), upon receipt of a request for activation of user U1 on gateway C2 following failure of the data tunnel between AP1 and C1, gateway node C2 is operable to authorize and activate the user or users on C2 based on the uniform mapping information for the cluster. In this state, a standby data tunnel between AP1 and C2 is used in transporting data for user U1. Further, C2 transmits a gratuitous ARP upstream to LAN switch 320 to allow return data traffic to AP1 for U1 is received at C2.

A heartbeat signal may be generated by C2 and detected by AP1 to inform AP1 that the standby data tunnel between AP1 and C2 is active. In the failover state illustrated in FIG. 3C, a tunnel orchestrator service continues to attempt to reestablish the original tunnel between AP1 and C1 in order to transition back to the original gateway mapping provided in the uniform mapping information.

Figure 3D:
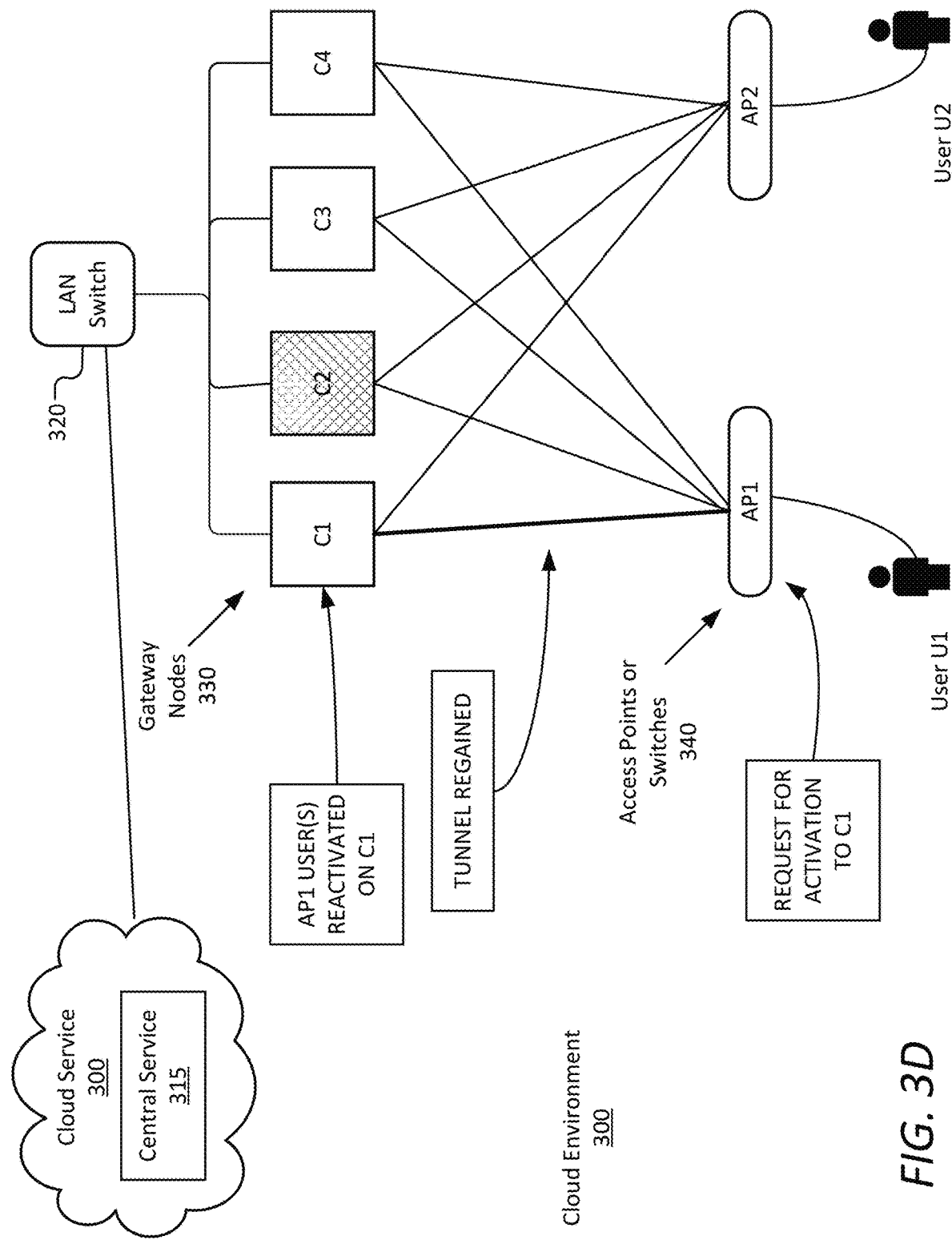
FIG. 3D is an illustration of a system in a state following reestablishment of a tunnel, according to some examples.

FIG. 3D is an illustration of a system in a state following reestablishment of a tunnel, according to some examples. In a cloud environment 300 including the cloud service 310 with central service 315, LAN switch 320, cluster of gateway nodes 330 (C1, C2, C3, C4), and multiple access points or switches 340 (AP1, AP2), upon reestablishment of the data tunnel between AP1 and C1, AP1 generates a request for activation of user U1 on gateway C1 to transition back to the gateway mapping indicated in the uniform mapping information for the cluster. Upon receipt of the request and successful authorization of the user U1, U1 is reactivated on C1, and is deactivated on C2. Further, C1 transmits a gratuitous ARP upstream to LAN switch 320 to allow return data traffic to AP1 for U1 is received at C1. A heartbeat signal is again generated by C1 and detected by AP1 to inform AP1 that the data tunnel between AP1 and C1 is active. In this manner, the elements of the system are returned to the original state as indicated in the uniform mapping information, allowing for additional failover operation if a tunnel failure occurs.

Figure 4:
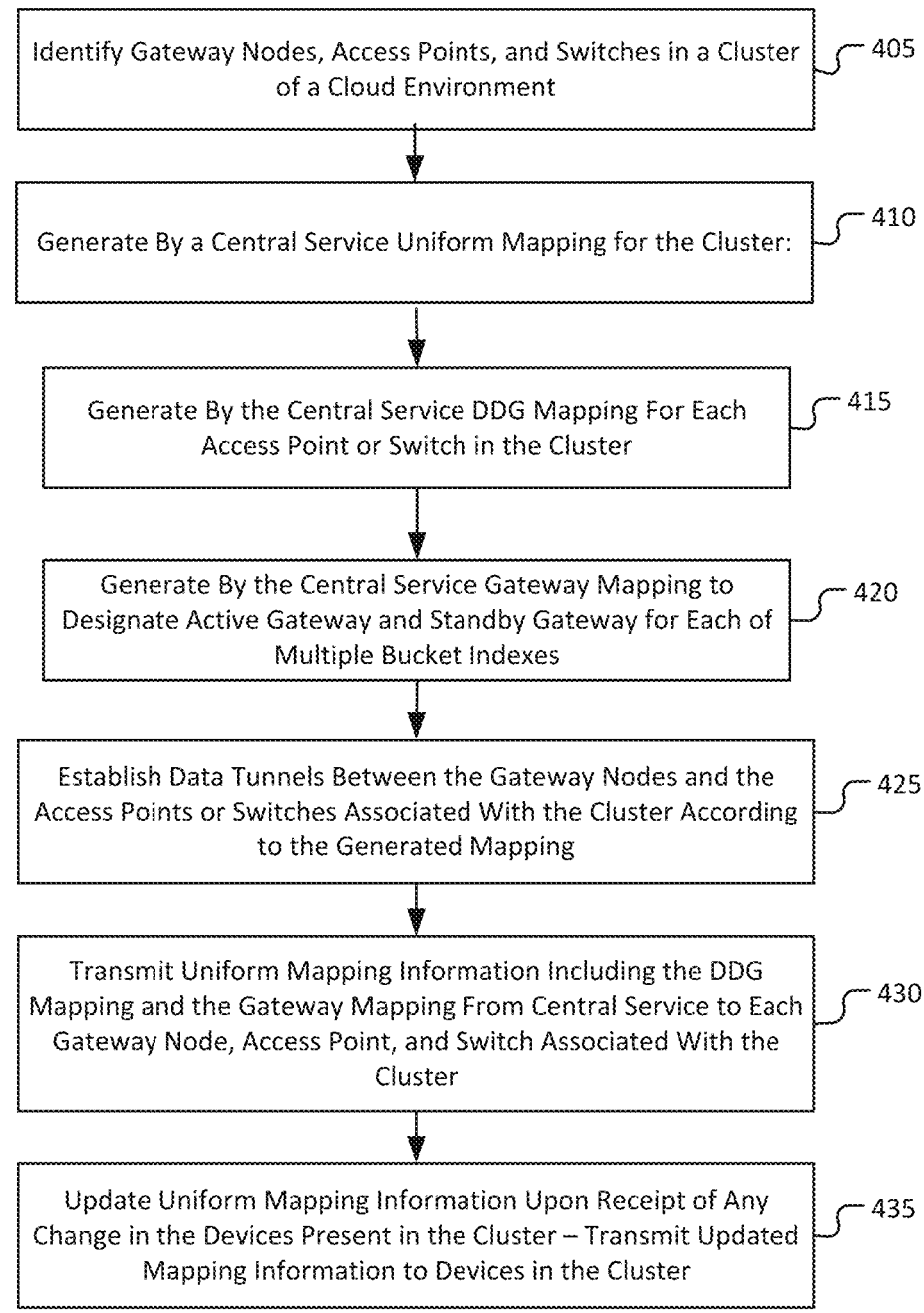
FIG. 4 is a flowchart to illustrate an example of a process for generation of uniform gateway mapping information for a cluster in a cloud environment to support continued data flow upon tunnel failure, according to some examples.

FIG. 4 is a flowchart to illustrate an example of a process for generation of uniform gateway mapping information for a cluster in a cloud environment to support continued data flow upon tunnel failure, according to some examples. An example process 400 for generation of uniform gateway mapping information for a cluster in a cloud environment includes identification of gateway nodes, access points, and switched in a cluster 405. A central service of a cloud service is to generate uniform mapping information for the cluster 410, which may include generating DDG (Device Designated Gateway) mapping for each access point or switch in the cluster 415 and generating gateway mapping to designate an active gateway and a standby gateway for each of multiple bucket indexes 420.

In some examples, the process 400 further provides for establishing data tunnels between the gateway nodes and the access points or switches associated with the cluster according to the generated mapping 425, wherein the tunnels may be established by a tunnel orchestrator service (such as OTO 202 illustrated in FIG. 2), and transmitting the generated uniform mapping information, including the DDG mapping and the gateway mapping, from the central service to each gateway node, access point, and switch in the cluster 430. The process 400 may further includes updating the uniform mapping information upon receipt of any change in the devices in the cluster, and transmitting the updated mapping to each of the devices in the cluster 435.

Figure 5:
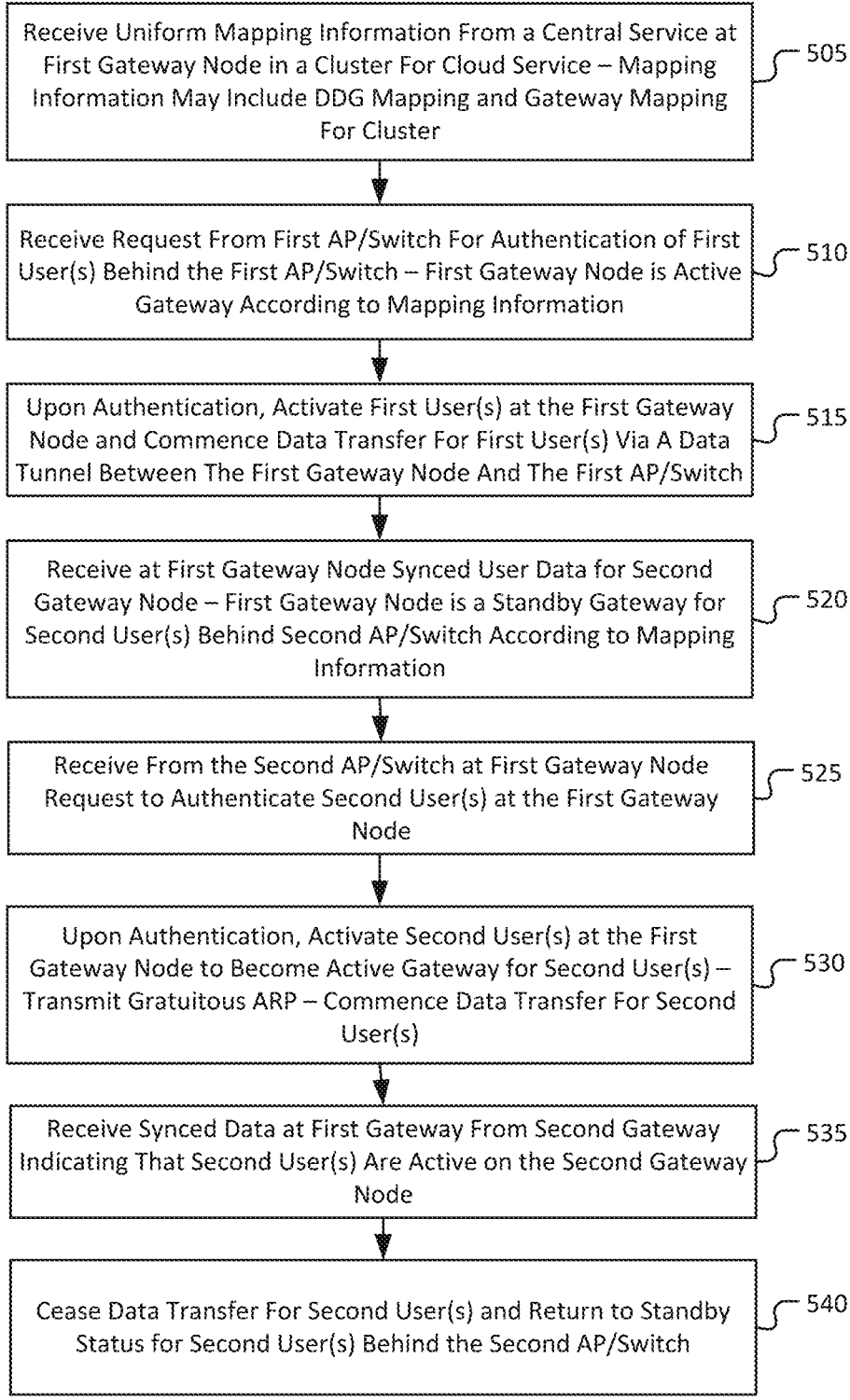
FIG. 5 is a flowchart to illustrate an example of a process for seamless failover upon loss of a tunnel in a cloud environment, according to some examples.

FIG. 5 is a flowchart to illustrate an example of a process for seamless failover upon loss of a tunnel in a cloud environment, according to some examples. An example process 500 for failover upon loss of a tunnel includes receiving uniform mapping information from a central service at first gateway node in a cluster for cloud service 505, wherein the uniform mapping information may include mapping a DDG for each access point or switch in the cluster, and gateway mapping for the gateway nodes, access points, and switches in the cluster.

In some examples, the process 500 further includes receiving a request from a first access point or switch for authentication of first user(s) behind the first AP/switch 510, wherein the first gateway node is the active gateway for the first AP/switch according to the uniform mapping information. Upon authentication of the first user(s), the first user(s) are activated at the first gateway node and data transfer is commenced for the first user(s) via a data tunnel between the first gateway node and the first AP/switch 515. In addition, synchronized user data for a second gateway node is received at the first gateway node 520, wherein the first gateway node is a standby gateway for second user(s) behind a second AP/switch according to the uniform mapping information.

In some examples, during operation a request from the second AP/switch may be received at the first gateway node, the request asking for the second user(s) to be authenticated at the first gateway node 525. The request may result from the second AP/switch detecting that a data tunnel between the second AP/switch and the second gateway node has been lost, with the first gateway node being the standby gateway for the second user(s) according to the uniform mapping information for the cluster. Upon authentication, the second user(s) are activated at the first gateway node to become active gateway for the second user(s) 530. A gratuitous ARP is sent upstream to a switch, and the first gateway node commences data transfer for the second user(s) via a data tunnel between the first gateway node and the second AP/switch.

In some examples, synchronized data may be received at the first gateway node from the second gateway node indicating that the second user(s) are active on the second gateway node 535. This may occur in response to the original tunnel between the second gateway node and the second AP/switch being reestablished. In response to receipt of the data, the first gateway node may deactivate the second user(s) on the first gateway node and cease data transfer for the second user(s), and return to standby status for the second user(s) behind the second AP/switch 540.

Figure 6:
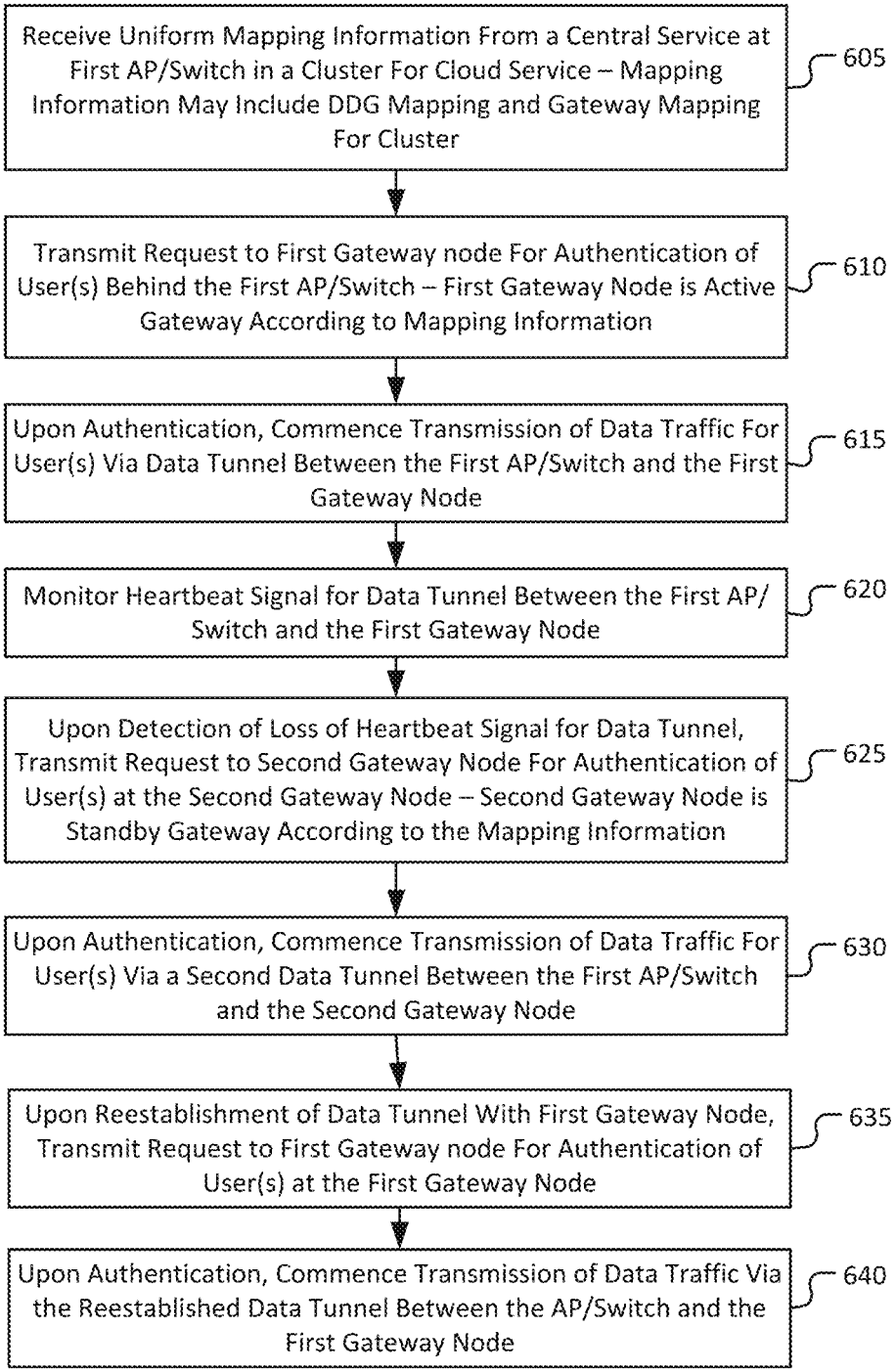
FIG. 6 is a flowchart to illustrate an example of a process for operation of an access point or switch in a tunnel failure in a cloud environment, according to some examples.

FIG. 6 is a flowchart to illustrate an example of a process for operation of an access point or switch in a tunnel failure in a cloud environment, according to some examples. An example process 600 includes receiving uniform mapping information from a central service at a first access point or switch in a cluster for cloud service 605, wherein the uniform mapping information may include mapping a DDG for each access point or switch in the cluster, and gateway mapping for the gateway nodes, access points, and switches in the cluster.

In some examples, the process 600 further includes transmitting a request to a first gateway node for authentication of user(s) behind the first AP/switch 610, wherein the first gateway node is the active gateway for the first AP/switch according to the uniform mapping information. Upon authentication of the user(s), data transfer for the user(s) is commenced via a data tunnel between the first AP/switch and the first gateway node 615. The first AP/switch monitors a heartbeat signal for the data tunnel between the first AP/switch and the first gateway node 620.

In some examples, upon detection of a loss of the heartbeat signal for the data tunnel (indicating loss of the tunnel), the first AP/switch is to transmit a request to a second gateway node, the request asking for the user(s) to be authenticated at the second gateway node 625, with the second gateway node being the standby gateway for the user(s) according to the uniform mapping information for the cluster. Upon authentication, data traffic is commenced for the user(s) via a second data tunnel between the first AP/switch and the second gateway node 630.

In some examples, upon reestablishment of the data tunnel with the first gateway node a request is transmitted to the first gateway node for authentication of the user(s) at the first gateway node 635. Upon authentication, the first AP/switch again commences data transfer for the user(s) via the reestablished data tunnel between the first AP/switch and the first gateway node 640.

Figure 7:
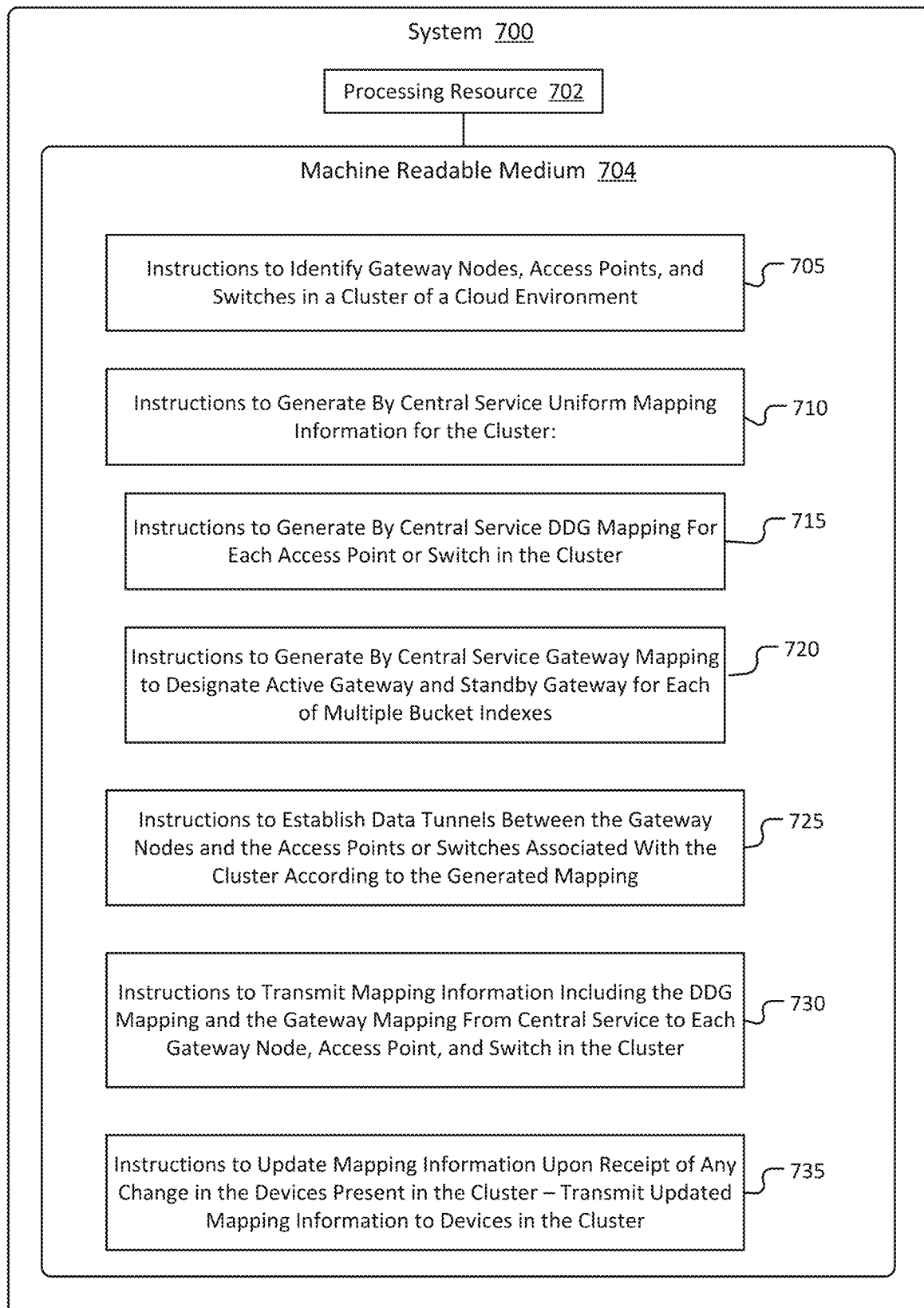
FIG. 7 depicts an example system to provide for generation of uniform gateway mapping information for a cluster in a cloud environment to support continued data flow upon tunnel failure.

FIG. 7 depicts an example system to provide for generation of uniform gateway mapping information for a cluster in a cloud environment to support continued data flow upon tunnel failure. An example system 700 includes a non-transitory, machine readable medium 704 encoded with example instructions 705, 710, 715, 720, 725, 730, and 735 (collectively referred to as instructions 705-735) executable by a processing resource 702. In some implementations, the system 700 may be useful for performing process 400 of FIG. 4.

The processing resource 702 may include a microcontroller, a microprocessor, central processing unit core(s), an ASIC (Application-Specific Integrated Circuit), an FPGA (Field-Programmable Gate Array), and/or other hardware device suitable for retrieval and/or execution of instructions from the machine readable medium 704 to perform functions related to various examples. Additionally or alternatively, the processing resource 702 may include or be coupled to electronic circuitry or dedicated logic for performing some or all of the functionality of the instructions.

The machine readable medium 704 may be any medium suitable for storing executable instructions, such as RAM (Random-Access Memory), ROM (Read-Only Memory), EEPROM (Electrically Erasable Programmable Read-Only Memory), flash memory, a hard disk drive, an optical disc, or the like. In some example implementations, the machine readable medium 704 may be a tangible, non-transitory medium. The machine readable medium 704 may be disposed within the system 700, in which case the executable instructions may be deemed installed or embedded on the system 700. Alternatively, the machine readable medium 704 may be a portable (e.g., external) storage medium, and may be part of an installation package.

As described further herein below, the machine readable medium 704 may be encoded with a set of executable instructions 705-735. It should be understood that part or all of the executable instructions and/or electronic circuits included within one box may, in alternate implementations, be included in a different box shown in the figures or in a different box not shown. Some implementations of the system 700 may include more or fewer instructions than are shown in FIG. 7.

Instructions 705, when executed, cause the processing resource 702 to identify gateway nodes, access points, and switched in a cluster. Instructions 710, when executed, cause the processing resource to generate by a central service of a cloud service uniform mapping information for the cluster, which may include: Instructions 715, when executed, cause the processing resource 702 to generate DDG mapping for each access point or switch in the cluster, and instructions 720, when executed, cause the processing resource 702 to generate gateway mapping to designate an active gateway and a standby gateway for each of multiple bucket indexes.

Instructions 725, when executed, cause the processing resource 702 to establish data tunnels between the gateway nodes and the access points or switches associated with the cluster according to the generated mapping. Instructions 730, when executed, cause the processing resource 702 to transmit the generated uniform mapping information, including the DDG mapping and the gateway mapping, from the central service to each gateway node, access point, and switch in the cluster. Instructions 735, when executed, cause the processing resource 702 to update the uniform mapping information upon receipt of any change in the devices in the cluster, and transmit the updated mapping to each of the devices in the cluster.

Figure 8:
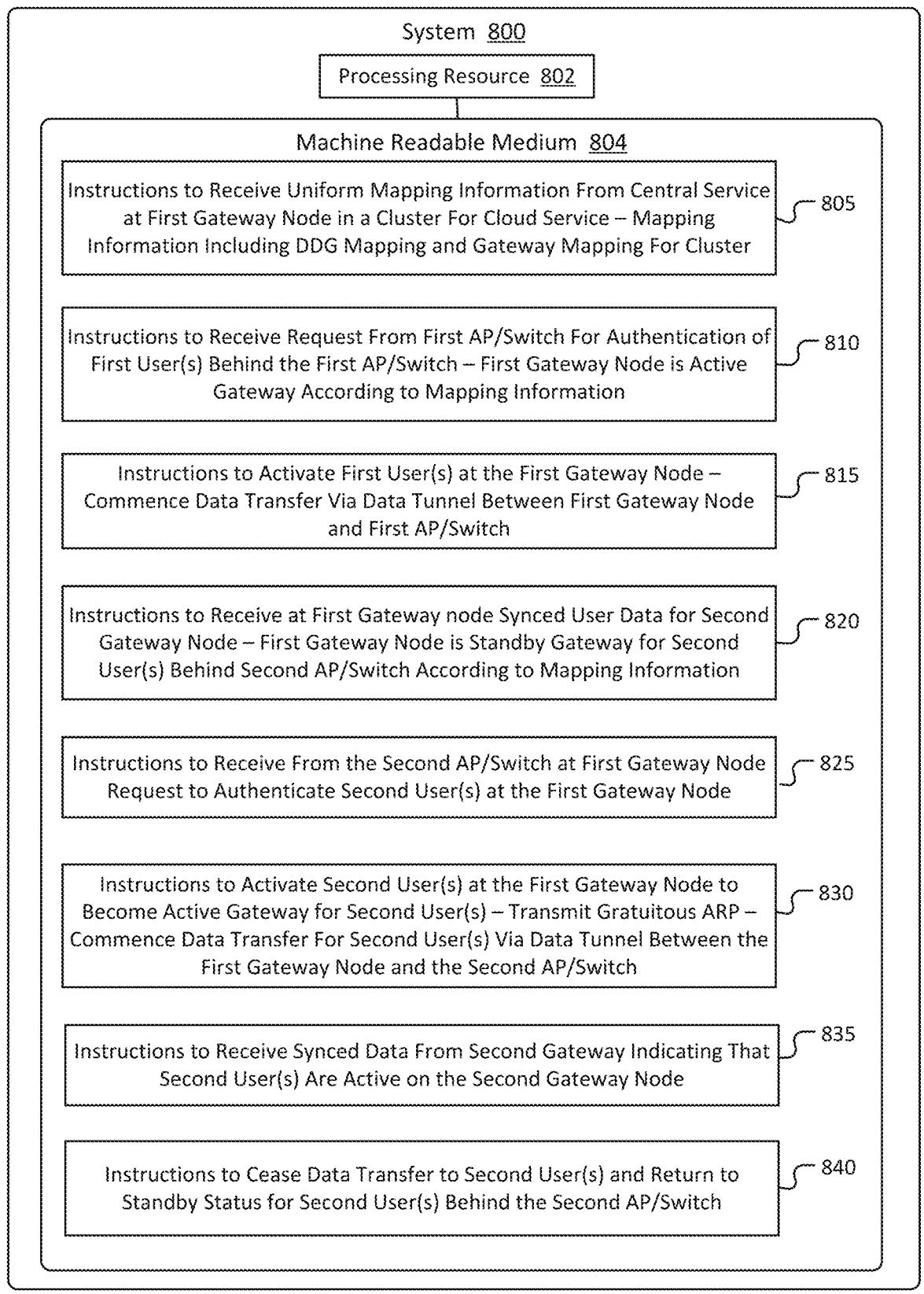
FIG. 8 depicts an example system to provide for seamless failover upon loss of a tunnel in a cloud environment.

FIG. 8 depicts an example system to provide for seamless failover upon loss of a tunnel in a cloud environment. An example system 800 includes a non-transitory, machine readable medium 804 encoded with example instructions 805, 810, 815, 820, 825, 830, 835, and 840 (collectively referred to as instructions 805-840) executable by a processing resource 802. In some implementations, the system 800 may be useful for performing process 500 of FIG. 5.

The processing resource 802 and the machine readable medium 804 may be as described for processing resource 702 and machine readable medium 704 in FIG. 7, and the relevant description is not repeated herein. As described further herein below, the machine readable medium 804 may be encoded with a set of executable instructions 805-840. It should be understood that part or all of the executable instructions and/or electronic circuits included within one box may, in alternate implementations, be included in a different box shown in the figures or in a different box not shown. Some implementations of the system 800 may include more or fewer instructions than are shown in FIG. 8.

Instructions 805, when executed, cause the processing resource 802 to receive uniform mapping information from a central service at first gateway node in a cluster for cloud service, wherein the uniform mapping information may include mapping a DDG for each access point or switch in the cluster, and gateway mapping for the gateway nodes, access points, and switches in the cluster.

Instructions 810, when executed, cause the processing resource 802 to receive a request from a first access point or switch for authentication of first user(s) behind the first AP/switch, wherein the first gateway node is the active gateway for the first AP/switch according to the uniform mapping information.

Instructions 815, when executed, cause the processing resource 802 to, upon authentication of the first user(s), activate the first user(s) at the first gateway node and commence data transfer for the first user(s) via a data tunnel between the first gateway node and the first AP/switch. Instructions 820, when executed, cause the processing resource 802 to receive synchronized user data for a second gateway node is received at the first gateway node, wherein the first gateway node is a standby gateway for second user(s) behind a second AP/switch according to the uniform mapping information.

Instructions 825, when executed, cause the processing resource 802 to receive a request from the second AP/switch at the first gateway node, the request asking for the second user(s) to be authenticated at the first gateway node. The request may result from the second AP/switch detecting that a data tunnel between the second AP/switch and the second gateway node has been lost, with the first gateway node being the standby gateway for the second user(s) according to the uniform mapping information for the cluster. Instructions 830, when executed, cause the processing resource 802 to, upon authentication, activate the second user(s) at the first gateway node to become active gateway for the second user(s). The instructions 830 further include sending a gratuitous ARP upstream to a switch, and commencing data transfer by the first gateway node for the second user(s) via a data tunnel between the first gateway node and the second AP/switch.

Instructions 835, when executed, cause the processing resource 802 to receive synchronized data at the first gateway node from the second gateway node indicating that the second user(s) are active on the second gateway node. This may occur in response to the original tunnel between the second gateway node and the second AP/switch being reestablished. Instructions 840, when executed, cause the processing resource 802 to, in response to receipt of the data, deactivate the second user(s) on the first gateway node and cease data transfer by the first gateway node for the second user(s), and return to standby status for the second user(s) behind the second AP/switch.

Figure 9:
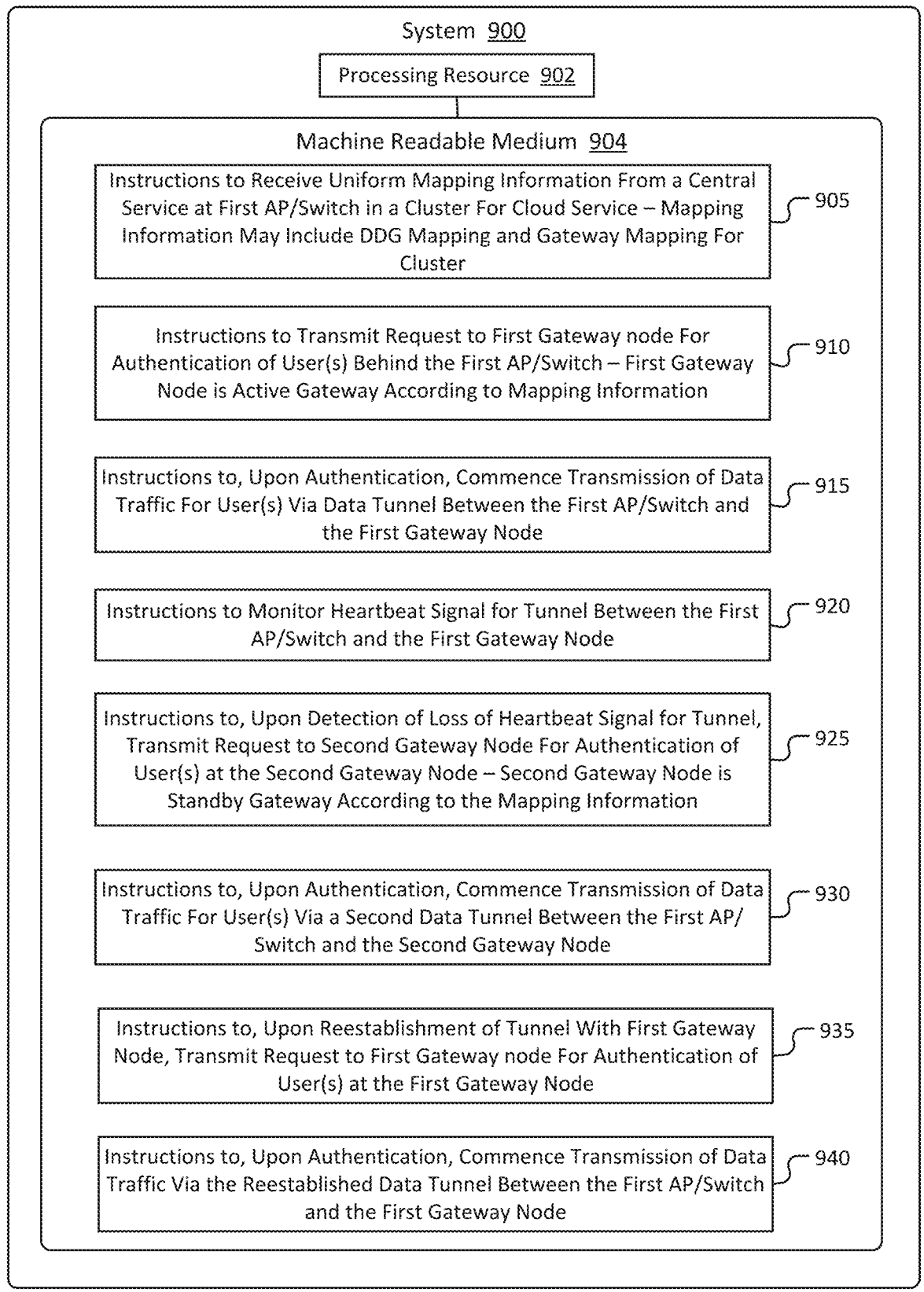
FIG. 9 depicts an example system to provide for operation of an access point or switch upon tunnel failure in a cloud environment.

FIG. 9 depicts an example system to provide for operation of an access point or switch upon tunnel failure in a cloud environment. An example system 900 includes a non-transitory, machine readable medium 904 encoded with example instructions 905, 910, 915, 920, 925, 930, 935, and 940 (collectively referred to as instructions 905-940) executable by a processing resource 902. In some implementations, the system 900 may be useful for performing process 600 of FIG. 6.

The processing resource 902 and the machine readable medium 904 may be as described for processing resource 702 and machine readable medium 704 in FIG. 7, and the relevant description is not repeated herein. As described further herein below, the machine readable medium 904 may be encoded with a set of executable instructions 905-940. It should be understood that part or all of the executable instructions and/or electronic circuits included within one box may, in alternate implementations, be included in a different box shown in the figures or in a different box not shown. Some implementations of the system 900 may include more or fewer instructions than are shown in FIG. 9.

Instructions 905, when executed, cause the processing resource 902 to receive uniform mapping information from a central service at a first access point or switch in a cluster for a cloud service, wherein the uniform mapping information may include mapping a DDG for each access point or switch in the cluster, and gateway mapping for the gateway nodes, access points, and switches in the cluster.

Instructions 910, when executed, cause the processing resource 902 to transmit a request to a first gateway node for authentication of user(s) behind the first AP/switch, wherein the first gateway node is the active gateway for the first AP/switch according to the uniform mapping information. Instructions 915, when executed, cause the processing resource 902 to, upon authentication of the user(s), commence data transfer for the user(s) via a data tunnel between the first AP/switch and the first gateway node.

Instructions 920, when executed, cause the processing resource 902 to monitor at the first AP/switch a heartbeat signal for the data tunnel between the first AP/switch and the first gateway node. Instructions 925, when executed, cause the processing resource 902 to, upon detection of a loss of the heartbeat signal for the data tunnel (indicating loss of the tunnel), transmitting a request from the first AP/switch to a second gateway node, the request asking for the user(s) to be authenticated at the second gateway node, with the second gateway node being the standby gateway for the user(s) according to the uniform mapping information for the cluster. Instructions 930, when executed, cause the processing resource 902 to, upon authentication, commence transmission of data traffic for the user(s) via a second data tunnel between the first AP/switch and the second gateway node.

Instructions 935, when executed, cause the processing resource 902 to, upon reestablishment of the data tunnel with the first gateway node, transmit a request to the first gateway node for authentication of the user(s) at the first gateway node. Instructions 940, when executed, cause the processing resource 902 to, upon authentication, again commence transmission of data traffic for the user(s) via the reestablished data tunnel between the first AP/switch and the first gateway node.

In an example, a non-transitory computer-readable storage medium having stored thereon executable computer program instructions that, when executed by a processor, cause the processor to: receive, at a first gateway node of a plurality of gateway nodes in a cluster, uniform mapping information for the cluster, the uniform mapping information including a bucket map mapping an active gateway and a standby gateway for each of a plurality of entries, the bucket map including mapping the first gateway node as a standby gateway and a second gateway node as an active gateway for a first entry; receive, at the first gateway node, synchronized user information from the second gateway node, the user information including identification of a user associated with a first access point (AP) or switch that is indexed to the first entry; receive, at the first gateway node, a message from the first AP or switch requesting activation of the user on the first gateway node as a standby gateway upon failure of a data tunnel between the first AP or switch and the second gateway node; and in response to receipt of the message, activate the user on the first gateway node and send an acknowledgement to the first AP or switch.

In an example, a method includes receiving, at an AP or switch, uniform mapping information for a cluster of gateway nodes to provide cloud services, the uniform mapping information including a bucket map mapping an active gateway and a standby gateway for each of a plurality of entries, the bucket map including mapping a first gateway node as a standby gateway and a second gateway node as an active gateway for a first entry; indexing a user to the first entry of the bucket map, the user being associated with the AP or switch; transmitting a request for authentication of the user to the first gateway node; upon authentication of the user at the first gateway node, transmitting data traffic for the user via a data tunnel between the AP or switch and the first gateway node; monitoring, by the AP or switch, a heartbeat signal for the data tunnel; and, upon the AP or switch detecting loss of the heartbeat signal for the data tunnel, transmitting a request for authentication of the user to the second gateway node.

In an example, a computing system includes a processor; and a memory storing instructions that, when executed by the processor, cause the processor to: identify gateway nodes, APs, and switches associated with a cluster of gateway nodes in a cloud environment; generate by a central service uniform mapping information for the cluster, the uniform mapping information including a bucket map mapping an active gateway and a standby gateway for each of a plurality of entries; establish data tunnels between the gateway nodes and the APs or switches associated with the cluster according to the generated uniform mapping information; and transmit the uniform mapping information to each gateway node, access point, and switch associated with the cluster.

The following clauses pertain to further examples. Specifics may be applied anywhere in one or more examples. The various features of the different examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to examples described herein.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structure between illustrated components. The components described or illustrated herein may have additional inputs or outputs that are not illustrated or described.

Various examples may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various examples may be provided as a computer program product, which may include a computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, a non-transitory computer-readable storage medium has stored thereon data representing sequences of instructions that, when executed by a processor, cause the processor to perform certain operations.

Processes can be added to or deleted from any of the methods described above and information can be added or subtracted from any of the described messages without departing from the basic scope of the present examples. It will be apparent to those skilled in the art that many further modifications and adaptations can be made. The particular examples are not provided to limit the concept but to illustrate it. The scope of the examples is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

Reference in the specification to "an example," "one example," "some examples," or "other examples" means that a particular feature, structure, or characteristic described in connection with the examples is included in at least some examples, but not necessarily all examples. The various appearances of "an example," "one example," or "some examples" are not necessarily all referring to the same examples. It should be appreciated that in the foregoing description of examples, various features are sometimes grouped together in a single example, figure, or description thereof for the purpose of streamlining the disclosure and aiding in the understanding of one or more of the various novel aspects. This method of disclosure, however, is not to be interpreted as reflecting an intention that the claimed examples requires more features than are expressly recited in each claim. Rather, as the following claims reflect, novel aspects lie in less than all features of a single foregoing disclosed example. Thus, the claims are hereby expressly incorporated into this description, with each claim standing on its own as a separate example.

What is claimed is:

1. A non-transitory computer-readable storage medium having stored thereon executable computer program instructions that, when executed by a processor, cause the processor to:
   receive, at a first gateway node of a plurality of gateway nodes in a cluster, uniform mapping information for the cluster, the uniform mapping information including a bucket map mapping an active gateway and a standby gateway for each of a plurality of entries, the bucket map including mapping the first gateway node as a standby gateway and a second gateway node as an active gateway for a first entry;
   receive, at the first gateway node, synchronized user information from the second gateway node, the user information including identification of a user associated with a first access point (AP) or switch that is indexed to the first entry;
   receive, at the first gateway node, a message from the first AP or switch requesting activation of the user on the first gateway node as a standby gateway upon failure of a data tunnel between the first AP or switch and the second gateway node; and
   in response to receipt of the message, activate the user on the first gateway node and send an acknowledgement to the first AP or switch.

2. The storage medium of claim 1, further comprising instructions that, when executed by the processor, cause the processor to:
   upon activating the user on the first gateway node, transfer data traffic associated with the user to and from the first AP or switch via a second data tunnel between the first AP or switch and the first gateway node.

3. The storage medium of claim 1, wherein the uniform mapping information is received from a central service of a cloud service.

4. The storage medium of claim 3, wherein the uniform mapping information is utilized by each gateway node, AP, and switch associated with the cluster.

5. The storage medium of claim 1, wherein the uniform mapping information further includes a mapping of a selected gateway node as a DDG (Device Designated Gateway) for each AP or switch associated with the cluster.

6. The storage medium of claim 5, wherein a selected DDG for a particular AP or switch is responsible for all control plane communications to the access point or switch.

7. The storage medium of claim 1, further comprising instructions that, when executed by the processor, cause the processor to:
   receive, at the first gateway node, second synchronized user information from the second gateway node, the user information including identification of the user, wherein the data tunnel is reestablished between the first AP or switch and the second gateway node; and
   in response to receipt of the message, deactivate the user on the first gateway node and cease data transfer for the user.

8. The storage medium of claim 1, further comprising instructions that, when executed by the processor, cause the processor to:
   further in response to receipt of the message, send a gratuitous ARP (Address Resolution Protocol) to a switch that is upstream from the first gateway node.

9. The storage medium of claim 1, further comprising instructions that, when executed by the processor, cause the processor to:
   further in response to receipt of the message, generate a heartbeat signal to indicate that the second data tunnel is active.

* * * * *